United States Patent
Shibuki et al.

(10) Patent No.: US 9,683,475 B1
(45) Date of Patent: Jun. 20, 2017

(54) EXHAUST STRUCTURE OF VEHICLE

(71) Applicant: HONDA MOTOR CO., LTD., Tokyo (JP)

(72) Inventors: Katsuaki Shibuki, Wako (JP); Masaya Yazaki, Wako (JP); Satoru Nojima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/960,008

(22) Filed: Dec. 4, 2015

(51) Int. Cl.
| | |
|---|---|
| F02B 27/02 | (2006.01) |
| F01N 3/28 | (2006.01) |
| F01N 1/08 | (2006.01) |
| B62M 7/02 | (2006.01) |
| B62K 11/04 | (2006.01) |
| B62J 17/00 | (2006.01) |

(52) U.S. Cl.
CPC ............ *F01N 3/2885* (2013.01); *B62J 17/00* (2013.01); *B62K 11/04* (2013.01); *B62M 7/02* (2013.01); *F01N 1/089* (2013.01); *F01N 2230/04* (2013.01); *F01N 2590/04* (2013.01)

(58) Field of Classification Search
USPC ......... 60/272, 299, 302, 305, 312, 313, 322, 60/324
See application file for complete search history.

(56) References Cited

U.S. PATENT DOCUMENTS

| | | | | |
|---|---|---|---|---|
| 2007/0039317 A1* | 2/2007 | Momosaki | ................ | F01N 3/10 60/299 |
| 2012/0139226 A1* | 6/2012 | Yanagita | .................. | B62J 23/00 280/851 |
| 2013/0259760 A1* | 10/2013 | Kobayashi | ............. | B01D 53/94 422/170 |
| 2014/0060963 A1* | 3/2014 | Ono | ........................ | F01N 1/089 181/228 |
| 2014/0090926 A1* | 4/2014 | Uzawa | .................... | F01N 13/08 181/228 |

FOREIGN PATENT DOCUMENTS

JP 2005-083286 A 3/2005

\* cited by examiner

*Primary Examiner* — Binh Q Tran
(74) *Attorney, Agent, or Firm* — Birch, Stewart, Kolasch & Birch, LLP (57) ABSTRACT

To elongate an exhaust tail pipe wherein a muffler is covered by a rear cowl. An exhaust structure of a vehicle including a rear cowl covering a vehicle rear portion, a rear bank-muffler including a first and second expansion chamber partitioned by a partition, a first and second connecting pipe connecting the expansion chambers, and a tail pipe configured to discharge exhaust air from the rear bank-muffler. The rear bank-muffler is covered by the rear cowl, wherein outlines of the rear bank-muffler and the rear cowl are each formed such that the width decreases toward the vehicle rear. The tail pipe, the first connecting pipe, and the second connecting pipe are provided so as to penetrate the partition. A position where the tail pipe penetrates the partition and positions where the first connecting pipe and second connecting pipe penetrate the partition are offset from each other in the vertical direction.

17 Claims, 10 Drawing Sheets

EXHAUST STRUCTURE OF VEHICLE

BACKGROUND OF THE INVENTION

1. Field of the Invention

The present invention relates to an exhaust structure of a vehicle.

2. Description of Background of the Invention

An exhaust device is known for installation in a vehicle that includes a muffler in a rear portion of the exhaust device extending rearwardly from an engine is arranged inside a rear cowl that covers a vehicle rear portion. See, for example, Japanese Patent Application Publication No. 2005-83286. In Japanese Patent Application Publication No. 2005-83286, two tail pipes for discharging exhaust air to the outside are provided.

In a case of arranging a muffler inside a rear cowl as in the aforementioned conventional exhaust structure, the muffler needs to be formed in correspondence with the shape of the rear cowl, which limits the shape of the muffler. Even under such a limitation, it is desirable that the tail pipe be formed as long as possible to increase the flow velocity of exhaust air in the final stage, depending on the required output characteristic of an engine.

SUMMARY AND OBJECTS OF THE INVENTION

The present invention has been made in view of the circumstances mentioned above, and aims to elongate a tail pipe in an exhaust structure of a vehicle whose muffler is covered by a rear cowl.

To achieve the above objective, an embodiment of the present invention provides an exhaust structure of a vehicle comprising an engine (11); an exhaust device (25) of the engine (11); and a rear cowl (35) covering a vehicle rear portion. The exhaust device (25) includes an exhaust pipe (28) and a muffler (29) connected to a rear portion of the exhaust pipe (28). The muffler (29) includes multiple expansion chambers (C1, C2) partitioned by a partition (65), connecting pipes (67, 68) connecting the multiple expansion chambers (C1, C2), and a tail pipe (69) configured to discharge exhaust air from the muffler (29). The muffler (29) is covered by the rear cowl (35), wherein: outlines of the muffler (29) and the rear cowl (35) are each formed such that the width decreases toward the vehicle rear. The tail pipe (69) and the connecting pipes (67, 68) are provided so as to penetrate the partition (65) and positions where the tail pipe (69) and the connecting pipes (67, 68) penetrate the partition (65) are offset from each other in the vertical direction.

According to an embodiment of the present invention, the penetrating positions of the connecting pipes do not interfere with that of the tail pipe, whereby the tail pipe can be elongated even when the muffler and rear cowl are formed such that their widths decrease toward the vehicle rear. In addition, the muffler can be downsized in the width direction.

According to an embodiment of the present invention, one end (69a) of the tail pipe (69) is arranged in a foremost expansion chamber (C2) among the expansion chambers of the muffler (29); and the other end (69b) of the tail pipe (69) is opened to outer air from a rear portion of the muffler (29).

According to an embodiment of the present invention, it is possible to elongate the tail pipe by extending it from the foremost expansion chamber.

According to an embodiment of the present invention, the muffler (29) is partitioned into a first expansion chamber (C1) in a rear portion and a second expansion chamber (C2) in a front portion. Exhaust air introduced into the muffler (29) from the exhaust pipe (28) flows into the second expansion chamber (C2) through the connecting pipes (67, 68). One end (69a) of the tail pipe (69) is arranged in the second expansion chamber (C2) and the other end (69b) of the tail pipe (69) is opened to outside air from the rear portion of the muffler (29).

According to an embodiment of the present invention, it is possible to elongate the tail pipe by extending it from the second expansion chamber in the front portion to the rear portion of the muffler.

According to an embodiment of the present invention, a catalyst (67) accommodated inside the muffler (29) is supported by the partition (65); and the catalyst (67) and the connecting pipe (68) are arranged at substantially the same height in the vertical direction.

According to an embodiment of the present invention, although the catalyst is accommodated inside the muffler in this configuration, the catalyst can be prevented from interfering with the tail pipe, and thus the tail pipe can be elongated.

According to an embodiment of the present invention, the catalyst (67) is formed into a flat shape whose longitudinal direction is its width direction.

According to an embodiment of the present invention, the catalyst can be downsized in the vertical direction while ensuring capacity of the catalyst. Consequently, the catalyst does not interfere with the tail pipe, so that the tail pipe can be elongated.

According to an embodiment of the present invention, an outline of the muffler (29) is formed such that a width (W2) in a height position where the tail pipe (69) is arranged is smaller than a width (W1) in a height position where the connecting pipe (68) and the catalyst (67) are arranged.

According to an embodiment of the present invention, the width of the portion of the rear cowl covering the vicinity of the tail pipe can be reduced, whereby the muffler and rear cowl can be downsized.

According to an embodiment of the present invention, a tubular cover member (70) covers a part of the tail pipe (69) from outside in the radial direction; ends of the catalyst (67) and the connecting pipe (68) are opposed to an inner wall of the muffler (29); and a space between the cover member (70) and the tail pipe (69) communicates into the first expansion chamber (C1) through a connecting portion (72) between the cover member (70) and the inner wall.

According to an embodiment of the present invention, since the space between the tubular cover member and tail pipe can be used as an expansion chamber, the muffler can be downsized while capacity of the expansion chamber can be ensured.

According to an embodiment of the present invention, the cover member (70) is connected to the muffler (29) by welding; and a connecting portion (73a) of the connection is tapered in side view.

According to an embodiment of the present invention, an area of the welding portion of the cover member can be enlarged, and rigidity can be enhanced.

In the exhaust structure of a vehicle according to an embodiment of the present invention, the tail pipe can be elongated even when the muffler and rear cowl are formed such that their widths decrease toward the vehicle rear. In addition, the muffler can be downsized in the width direction.

It is also possible to elongate the tail pipe by extending it from the foremost expansion chamber.

It is also possible to elongate the tail pipe by extending it from the second expansion chamber in the front portion to the rear portion of the muffler.

Further, the catalyst does not interfere with the tail pipe, so that the tail pipe can be elongated.

In addition, the width of the rear cowl can be reduced, whereby the muffler and rear cowl can be downsized.

Also, the muffler can be downsized while capacity of the expansion chamber can be ensured.

Moreover, an area of the welding portion of the cover member can be enlarged, and rigidity can be enhanced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, an embodiment of the present invention will be described with reference to the drawings. Note that in the description, directions such as front, rear, left, and right coincide with directions relative to the vehicle body if not stated otherwise. In addition, in the drawings, reference numeral FR indicates the front of the vehicle body, UP the upper direction of the vehicle body, and LE the left of the vehicle.

Figure 1:
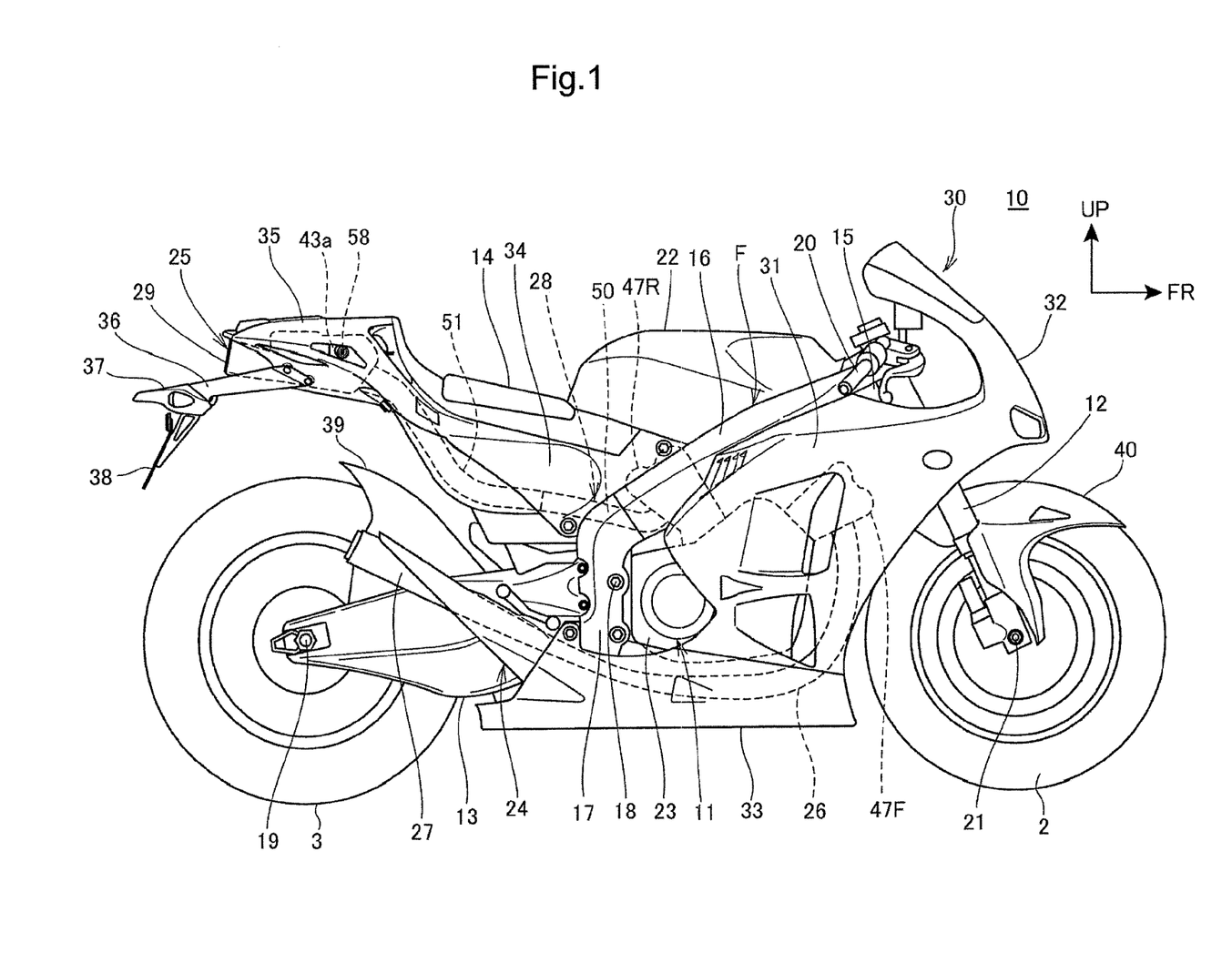
FIG. 1 is a right side view of a motorcycle including an exhaust structure of a vehicle of the present invention.

FIG. 1 is a right side view of a motorcycle 10 including an exhaust structure of a vehicle of the present invention.

The motorcycle 10 is a vehicle in which an engine 11 is supported by a body frame F; a front fork 12 supporting a front wheel 2 is steerably supported at the front end of the body frame F; and a swing arm 13 supporting a rear wheel 3 is provided on the rear side of the body frame F. The motorcycle 10 is a straddle type vehicle where a seat 14 on which a rider sits in a straddling manner is supported on a top portion of the body frame F.

The body frame F includes a head pipe 15 supporting the front fork 12 at the front end; paired left and right mainframes 16 extending obliquely downwardly in the rear direction from the head pipe 15; and paired left and right center frames 17 extending downwardly from rear portions of the mainframes 16. The body frame F also includes paired left and right seat frames (not shown) extending obliquely upwardly from rear portions of the mainframes 16 to a rear portion of the vehicle.

The swing arm 13 is supported in a vertically-swingable manner by a pivot shaft 18 provided in middle portions in the vertical direction of the left and right center frames 17. The rear wheel 3 is axially supported by an axle 19 at a rear end portion of the swing arm 13.

A steering handle 20 is attached to a top end portion of the front fork 12 with the front wheel 2 being supported to a bottom end portion of the front fork 12 through an axle 21.

A fuel tank 22 is supported by the left and right center frames 17 behind the head pipe 15. The seat 14 is positioned behind the fuel tank 22 and supported by the aforementioned seat frames.

The engine 11 is a V4 engine in which cylinders are arranged in a V-shape in the longitudinal direction. The engine 11 includes a crankcase 23 supporting a crankshaft extending in the vehicle width direction; a front bank 47F configured of two cylinders extending to the front from the crankcase 23 in an inclined manner; and a rear bank 47R configured of two cylinders extending rearwardly from the crankcase 23 in an inclined manner.

The engine 11 has a front bank side-exhaust device 24 connected to the front bank 47F, and a rear bank side-exhaust device 25 (exhaust device) connected to the rear bank 47R.

The front bank side-exhaust device 24 has an exhaust pipe 26 drawn from front faces of cylinder heads of the cylinders in the aforementioned front bank 47F and then collected into one pipe on its rear end side; and a front bank-muffler 27 arranged outside the swing arm 13 and connected to the rear end of the exhaust pipe 26.

The rear bank side-exhaust device 25 has an exhaust pipe 28 drawn from rear faces of cylinder heads of the cylinders in the rear bank 47R and then collected into one pipe on its rear end side; and a rear bank-muffler 29 arranged in a rear end portion of the motorcycle 10 and connected to the rear end of the exhaust pipe 28.

The motorcycle 10 includes a resin body cover 30 covering the vehicle body. The body cover 30 includes a front side cover 31 covering a front portion of the engine 11, the head pipe 15, and the mainframes 16; a front cowl 32 covering the head pipe 15 from the front; and an under cover 33 covering the engine 11 from below. The body cover 30 also includes a middle cover 34 covering the rear bank side-exhaust device 25 below the seat 14, and a rear cowl 35 covering the rear bank-muffler 29 behind the seat 14.

A rear stay 36 extending obliquely downwardly in the rear direction is provided on a lower face of the rear cowl 35, and a pair of blinkers 37 projecting to the left and right are provided at the rear end of the rear stay 36. A plate-shaped license plate holder 38 extending downwardly in the rear direction is also provided at the rear end of the rear stay 36.

A rear wheel cover 39 covering the rear wheel 3 from the upper front is attached to a front portion of the swing arm 13. A front fender 40 is attached to the front fork 12.

Figure 2:
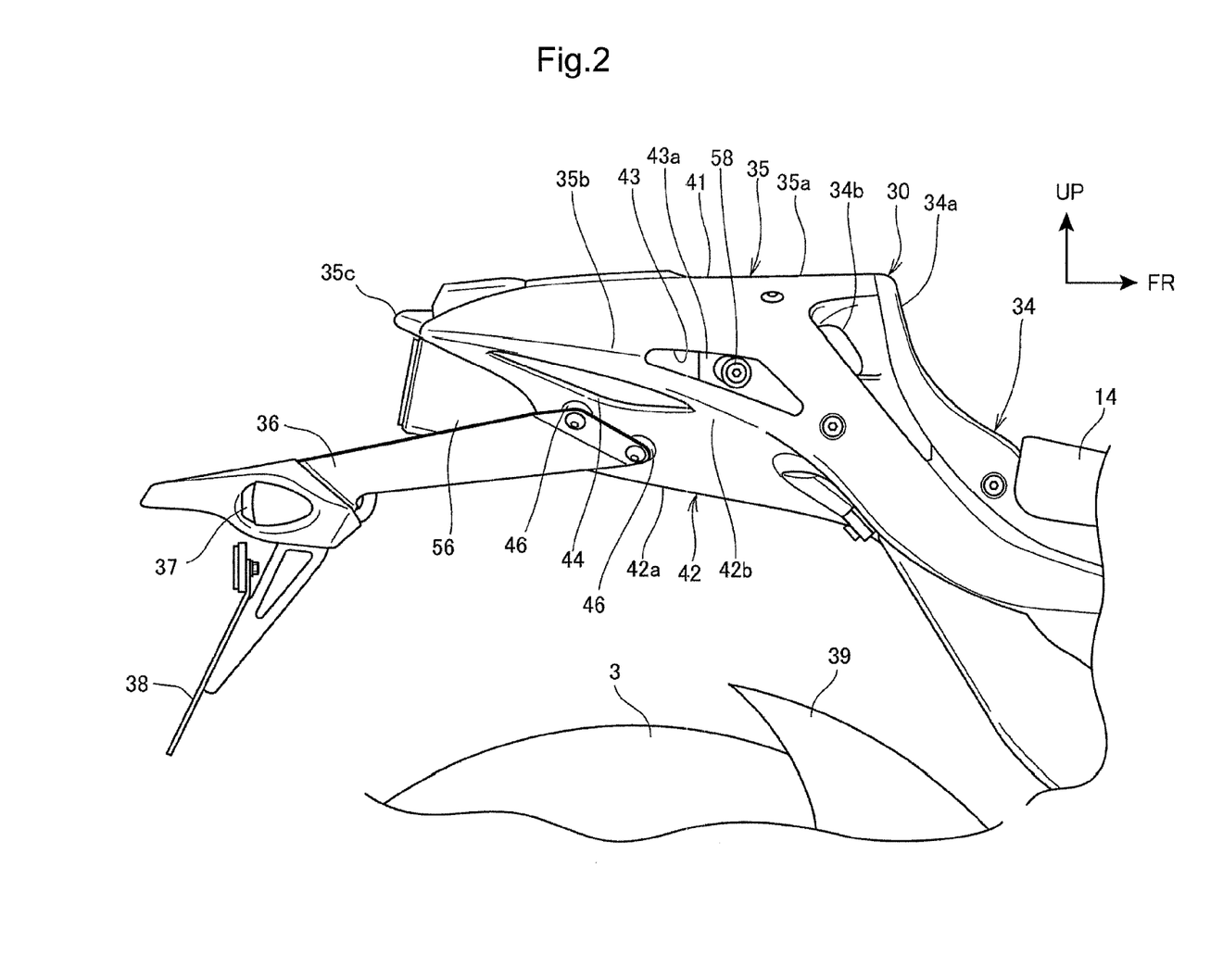
FIG. 2 is a right side view of the periphery of a rear cowl.
Figure 3:
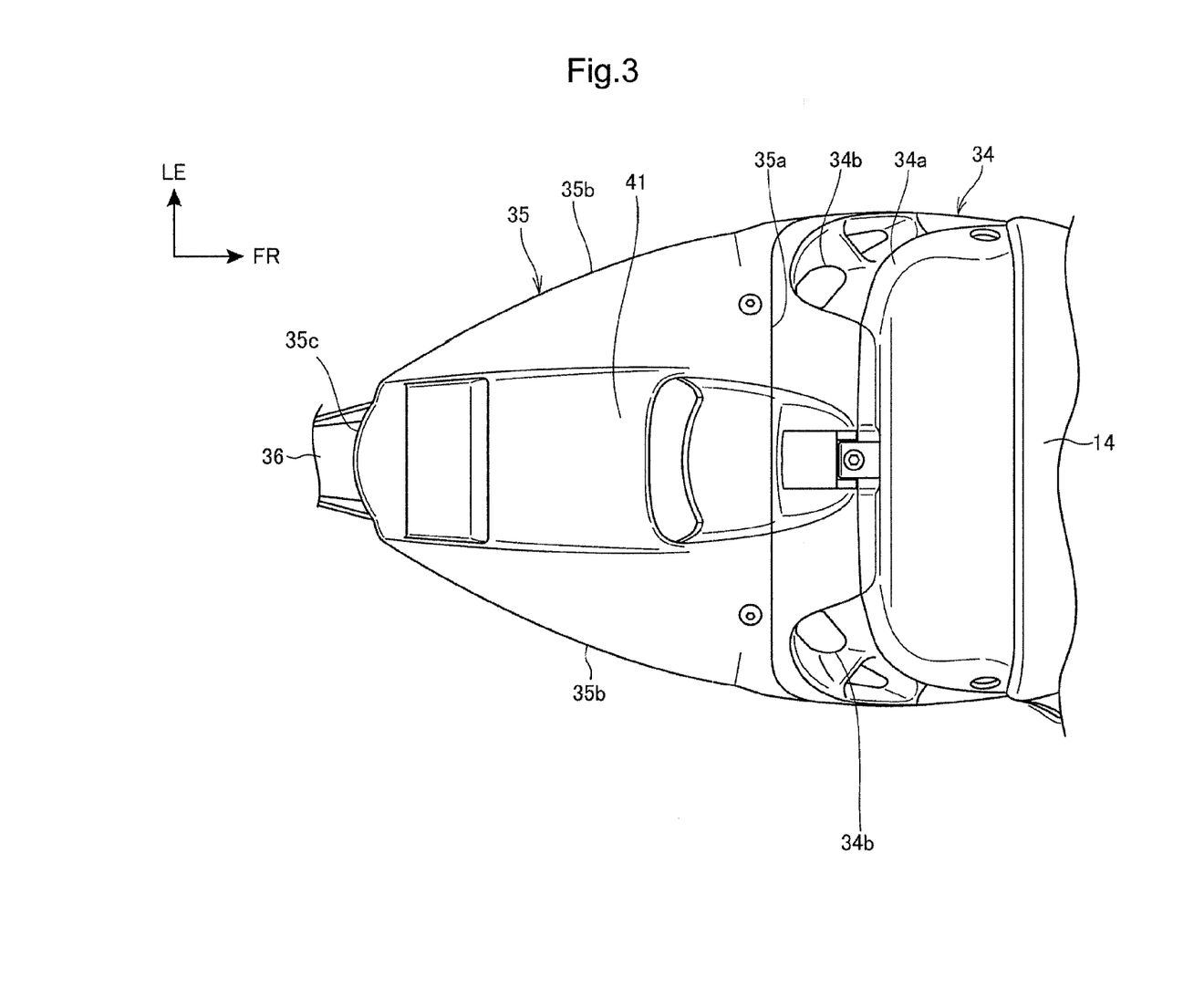
FIG. 3 is a plan view of the rear cowl as seen from above.
Figure 4:
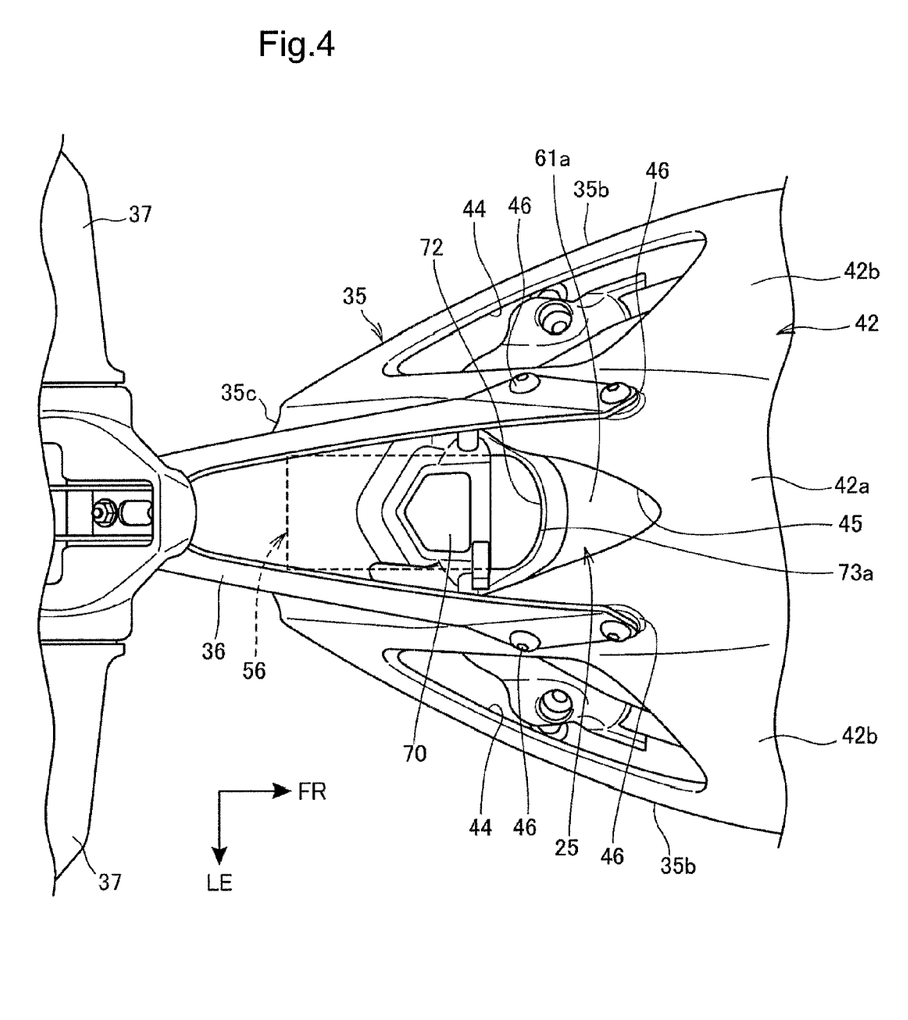
FIG. 4 is a plan view of the periphery of the rear cowl as seen from below.

FIG. 2 is a right side view of the periphery of the rear cowl 35. FIG. 3 is a plan view of the rear cowl 35 as seen from above. FIG. 4 is a plan view of the periphery of the rear cowl 35 as seen from below.

Referring to FIGS. 2 to 4, the middle cover 34 has an upwardly-extending portion 34a raised upwardly in the rear direction from the rear end side of the seat 14. Air introduction holes 34b, 34b communicating into the inside of the body cover 30 are provided on left and right sides of the upwardly-extending portion 34a.

The rear cowl 35 is provided so as to be continuous with the rear edge of the upwardly-extending portion 34a, and extends to the rear end of the body cover 30.

An outline of the rear cowl 35 is formed such that in plan view, its width increases toward the front end, and gradually decreases toward the vehicle rear, becoming narrower toward the rear end. More specifically, the outline of the rear cowl 35 in a plan view as seen from above includes a front edge portion 35a extending substantially straight in the width direction along the rear edge of the upwardly-extending portion 34a; side edge portions 35b, 35b extending rearwardly from left and right ends of the front edge portion 35a such that a distance therebetween becomes shorter toward the rear; and a rear edge portion 35c connecting the rear ends of the side edge portions 35b, 35b.

The outline of the rear cowl 35 is formed such that in a side view, its thickness increases in the vertical direction toward the front end, and gradually decreases toward the vehicle rear, growing thinner toward the rear end.

A top face 41 of the rear cowl 35 is curved such that its center in the vehicle width direction is positioned at the highest point, and portions continuous therewith become lower toward the outer sides in the vehicle width direction. The top face is also formed so as to be slightly inclined downwardly in the rear direction in side view.

A bottom face 42 of the rear cowl 35 is inclined upwardly in the rear direction in a side view. The bottom face 42 of the rear cowl 35 has a downwardly-bulging portion 42a bulging downwardly in its center in the vehicle width direction, and has a curved shape where the center in the vehicle width direction is positioned at the lowest point, and portions continuous therewith become higher toward the outer sides in the vehicle width direction. The downwardly-bulging portion 42a extends from the front end of the rear cowl 35 to a rear portion thereof.

A ventilating hole 43 long in the longitudinal direction is provided on each of left and right side faces of a front portion of the rear cowl 35. An inward-bulging portion 43a where a part of the rear cowl 35 bulges inwardly is formed in a front portion of the ventilating hole 43.

In addition, in the bottom face 42 of the rear cowl 35, exhaust holes 44, 44 long in the longitudinal direction are provided in bottom face-side portions 42b, 42b on left and right sides of the downwardly-bulging portion 42a. The exhaust holes 44, 44 are positioned behind the ventilating holes 43. A rear opening 45 designed to expose a rear portion of the rear bank-muffler 29 is provided in a rear end portion of the downwardly-bulging portion 42a.

The rear bank-muffler 29 is cooled by a flow of air introduced from the air introduction holes 34b, 34b and discharged from the exhaust holes 44, 44 as well as the rear opening 45.

Stay fixing portions 46, 46 to which the front end of the rear stay 36 is fastened are provided in a base portion of the downwardly-bulging portion 42a between the rear opening 45 and the left and right exhaust holes 44, 44.

Figure 5:
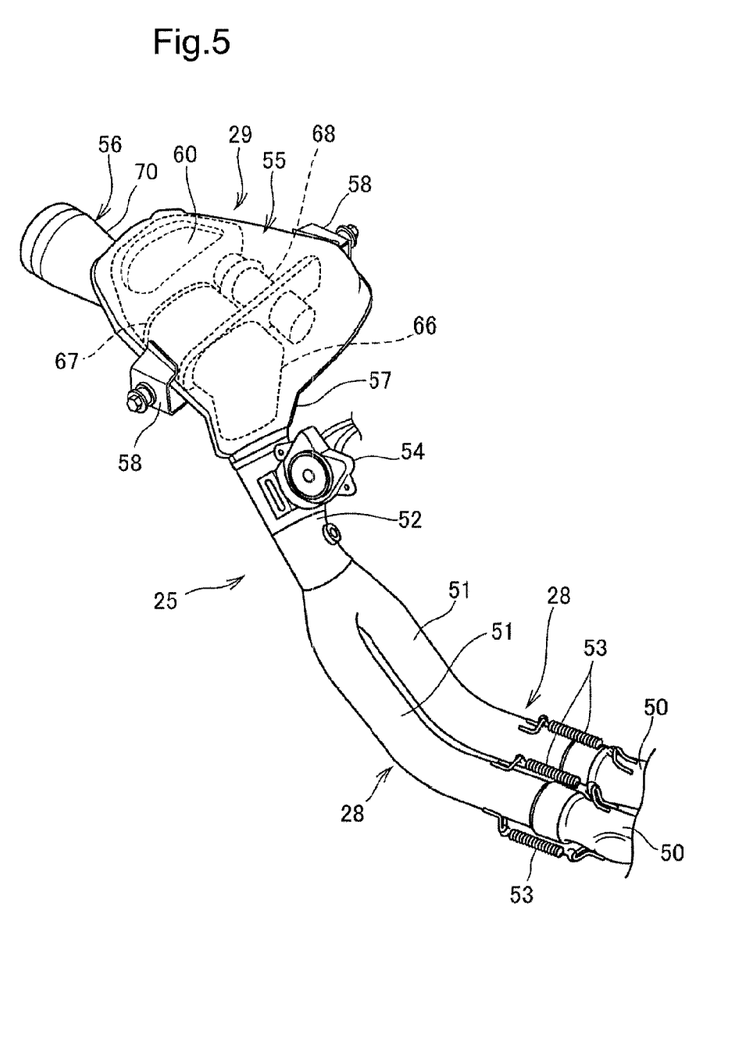
FIG. 5 is a perspective view of a rear bank side-exhaust device.

FIG. 5 is a perspective view of the rear bank side-exhaust device 25.

As shown in FIG. 5, the exhaust pipe 28 of the rear bank side-exhaust device 25 includes paired exhaust port connecting pipes 50, 50 drawn rearwardly from the cylinder heads of the cylinders of the rear bank 47R; upwardly-extending pipes 51, 51 extending upwardly in the rear direction from the rear ends of the exhaust port connecting pipes 50, 50; and a junction pipe 52 where the upwardly-extending pipes 51, 51 are joined into one pipe. The exhaust pipe 28 extends rearwardly while passing through one side (right side) in the vehicle width direction on which the front bank-muffler 27 is arranged.

The upwardly-extending pipes 51, 51 are not only fitted to the exhaust port connecting pipes 50, 50, but also connected to the exhaust port connecting pipes 50, 50 by multiple springs 53 bridged between the exhaust port connecting pipes 50, 50 and the upwardly-extending pipes 51, 51.

The junction pipe 52 has an exhaust valve (not shown) provided therein to vary an area of its flow path, and an actuator 54 provided on its outer face to activate the exhaust valve. The rear bank-muffler 29 is connected to the rear end of the junction pipe 52.

Figure 6:
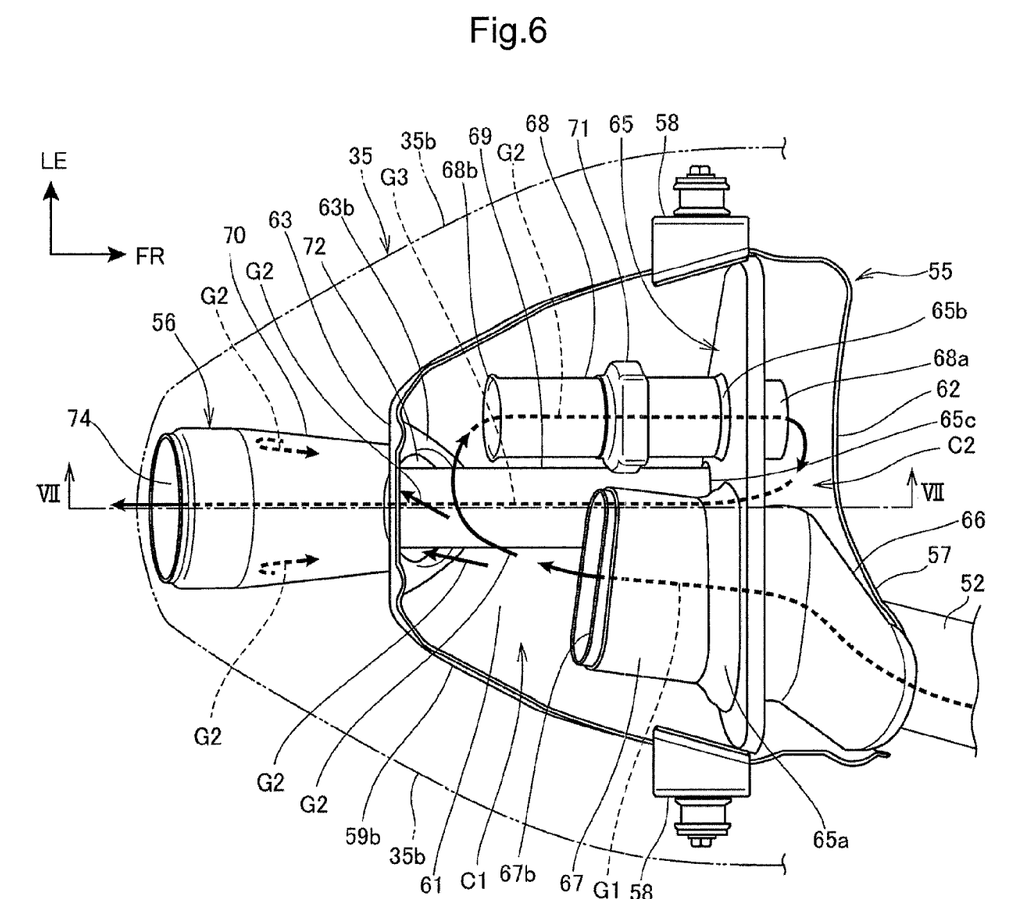
FIG. 6 is a plan view of a rear bank-muffler as seen from above.

FIG. 6 is a plan view of the rear bank-muffler 29 as seen from above. FIG. 6 shows not only the rear bank-muffler 29 but also the outline of the rear cowl 35 indicated by a two-dot chain line.

As shown in FIGS. 5 and 6, the rear bank-muffler 29 includes a muffler main body 55 formed into a box shape that fits inside the rear cowl 35, and a tubular tail portion 56 extending rearwardly from a rear portion of the muffler main body 55.

The muffler main body 55 is configured by coupling an upper half body 59a (FIG. 8) and a lower half body (FIG. 8) obtained by dividing the box shape into upper and lower parts. FIG. 6 shows a state where the upper half body 59a is separated and removed from the muffler main body 55 for a clear view of the internal structure.

The muffler main body 55 is configured in accordance with the shape of the rear cowl 35, and is formed such that its width is maximized on the front end side, and decreases toward the vehicle rear. An outline of the muffler main body 55 has, in plan view, side edge portions 55a, 55a following the side edge portions 35b, 35b of the rear cowl 35, and a rear edge portion 55b connecting the rear ends of the side edge portions 55a, 55a.

The muffler main body 55 has an exhaust pipe connecting portion 57 bulging downwardly in the front direction, on one side (right side) in the vehicle width direction in its front face. The rear end of the junction pipe 52 is connected to the exhaust pipe connecting portion 57.

Muffler fixing stays 58, 58 projecting in the vehicle width directions are provided on left and right sides of a front portion of the muffler main body 55. The inward-bulging portion 43a (FIG. 2) of the ventilating hole 43 of the rear cowl 35 is fixed from outside with a bolt to each of the muffler fixing stays 58, 58.

The rear stay 36 includes a plate portion 36a positioned below the tail portion 56. Left and right edge portions of the plate portion 36a extend so as to be continuous with the rear ends of the side edge portions 55a, 55a of the muffler main body 55, and the width of the plate portion 36a decreases toward the rear. The plate portion 36a is formed so as to have a larger width than the tail portion 56 of the rear bank-muffler 29, and covers the tail portion 56 from below.

Figure 7:
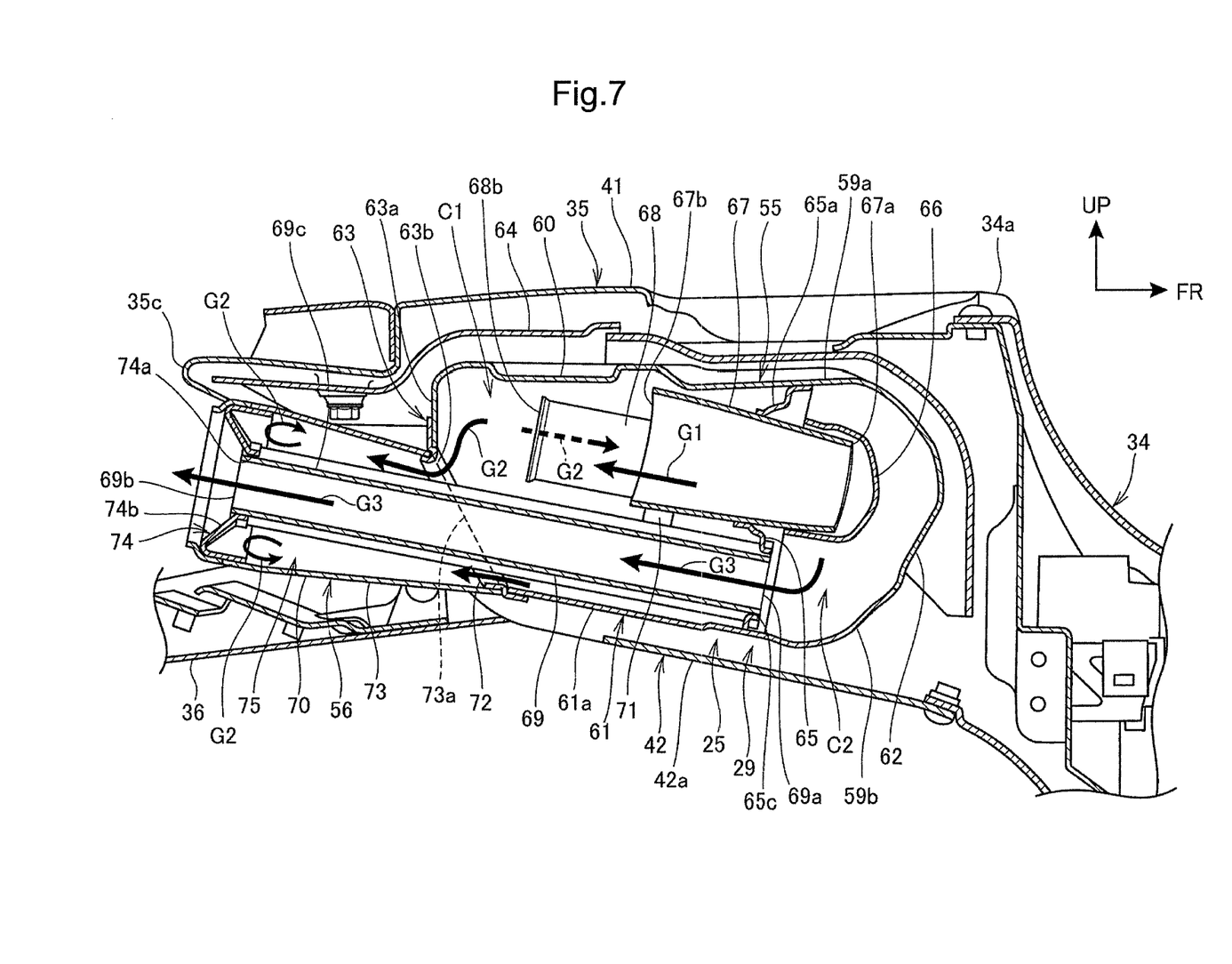
FIG. 7 is a cross-sectional view taken along line VII-VII of FIG. 6.
Figure 8:
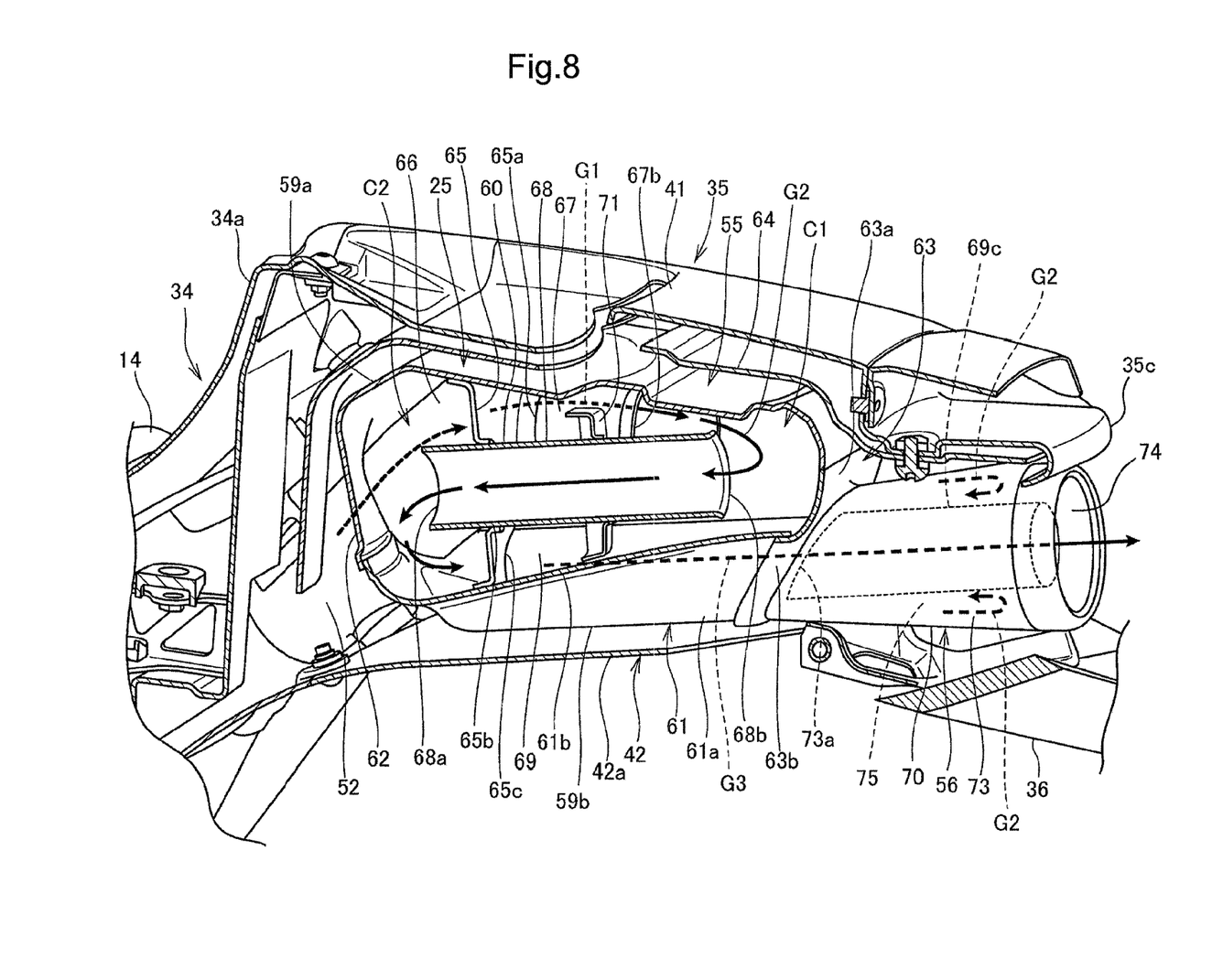
FIG. 8 is a cross-sectional view of the rear bank-muffler as seen from the left side.
Figure 9:
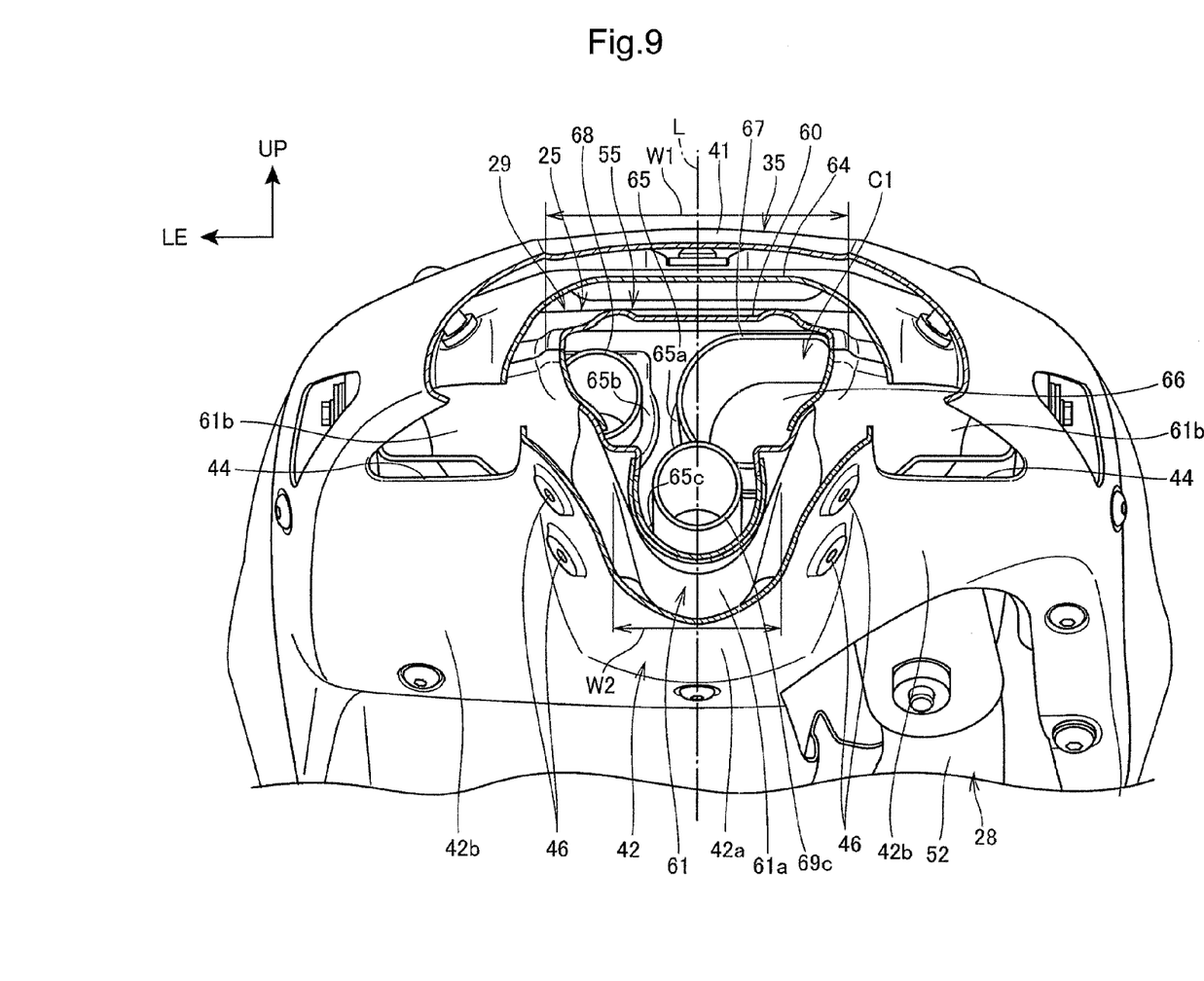
FIG. 9 is a cross-sectional view of a rear portion of the rear bank-muffler.

FIG. 7 is a cross-sectional view taken along line of FIG. 6. FIG. 8 is a cross-sectional view of the rear bank-muffler 29 as seen from the left side. FIG. 9 is a cross-sectional view of a rear portion of the rear bank-muffler 29.

As shown in FIGS. 6 to 9, the muffler main body 55 includes a top wall portion 60 extending along the top face 41 of the rear cowl 35; a bottom wall portion 61 extending obliquely upwardly in the rear direction along the bottom face 42 of the rear cowl 35; a front wall portion 62 where the exhaust pipe connecting portion 57 is provided; and a rear wall portion 63 on which the tail portion 56 is provided.

The bottom wall portion 61 has a bottom wall-bulging portion 61a bulging downwardly at the center in the vehicle width direction along the downwardly-bulging portion 42a of the bottom face 42 of the rear cowl 35 and bottom face-side wall portions 61b, 61b extending along the bottom face-side portions 42b, 42b of the rear cowl 35, while connecting the bottom wall-bulging portion 61a to the left and right side edges of the top wall portion 60. Since the bottom wall-bulging portion 61a and the bottom face-side wall portions 61b, 61b bulge downwardly in the form of curved surfaces, it can also be said that they constitute parts of left and right side wall portions of the muffler main body 55 in a side view.

As shown in FIG. 9, the muffler main body 55 is formed such that a width W2 of the bottom wall-bulging portion 61a is smaller than a width W1 on the top wall portion 60 side, and that the width gradually decreases from the top wall portion 60 toward the bottom wall-bulging portion 61a. More specifically, the sectional shape of the muffler main body 55 as seen from the rear is a substantially reverse triangular shape. The substantially reverse triangular shape is substantially symmetrical with respect to a center line L in the vehicle width direction.

In addition, the rear cowl 35 is formed so as to follow the outline of the muffler main body 55 with a predetermined gap between itself and the muffler main body 55, and its sectional shape is similarly a substantially reverse triangular shape. A plate-shaped insulating member 64 is provided between the top face 41 of the rear cowl 35 and the top wall portion 60 of the muffler main body 55.

The muffler main body 55 is a multistage expansion-type muffler having a plate-shaped partition 65 which partitions the inside of the muffler main body 55 into front and rear parts. A first expansion chamber C1 positioned in a rear portion of the muffler main body 55, and a second expansion chamber C2 positioned in a front portion thereof are formed inside the muffler main body 55 by use of the partition 65. The partition 65 is provided in the front portion of the muffler main body 55, and the first expansion chamber C1 on the rear side has a larger capacity than the second expansion chamber C2 on the front side.

The rear bank-muffler 29 includes an introduction pipe 66 provided in the exhaust pipe connecting portion 57 to introduce exhaust air into the muffler main body 55; a first communication pipe 67 (connecting pipe, catalyst) introducing exhaust air introduced into the introduction pipe 66 to the first expansion chamber C1 and a second communication pipe 68 (connecting pipe) through which the first expansion chamber C1 communicates into the second expansion chamber C2. The rear bank-muffler 29 also has a tail pipe 69 extending rearwardly from the second expansion chamber C2, and through which the second expansion chamber C2 communicates to the outside of the rear bank-muffler 29; and a tubular cover 70 (cover member) covering a rear portion of the tail pipe 69.

The bottom wall portion 61 of the muffler main body 55 is inclined upwardly in the rear direction along the bottom face 42 of the rear cowl 35, and the partition 65 is provided so as to be substantially perpendicular to the bottom wall portion 61. Accordingly, the partition 65 is arranged while being tilted in a forward direction with respect to the vertical direction, in proportion to the inclination amount of the bottom wall portion 61.

Figure 10:
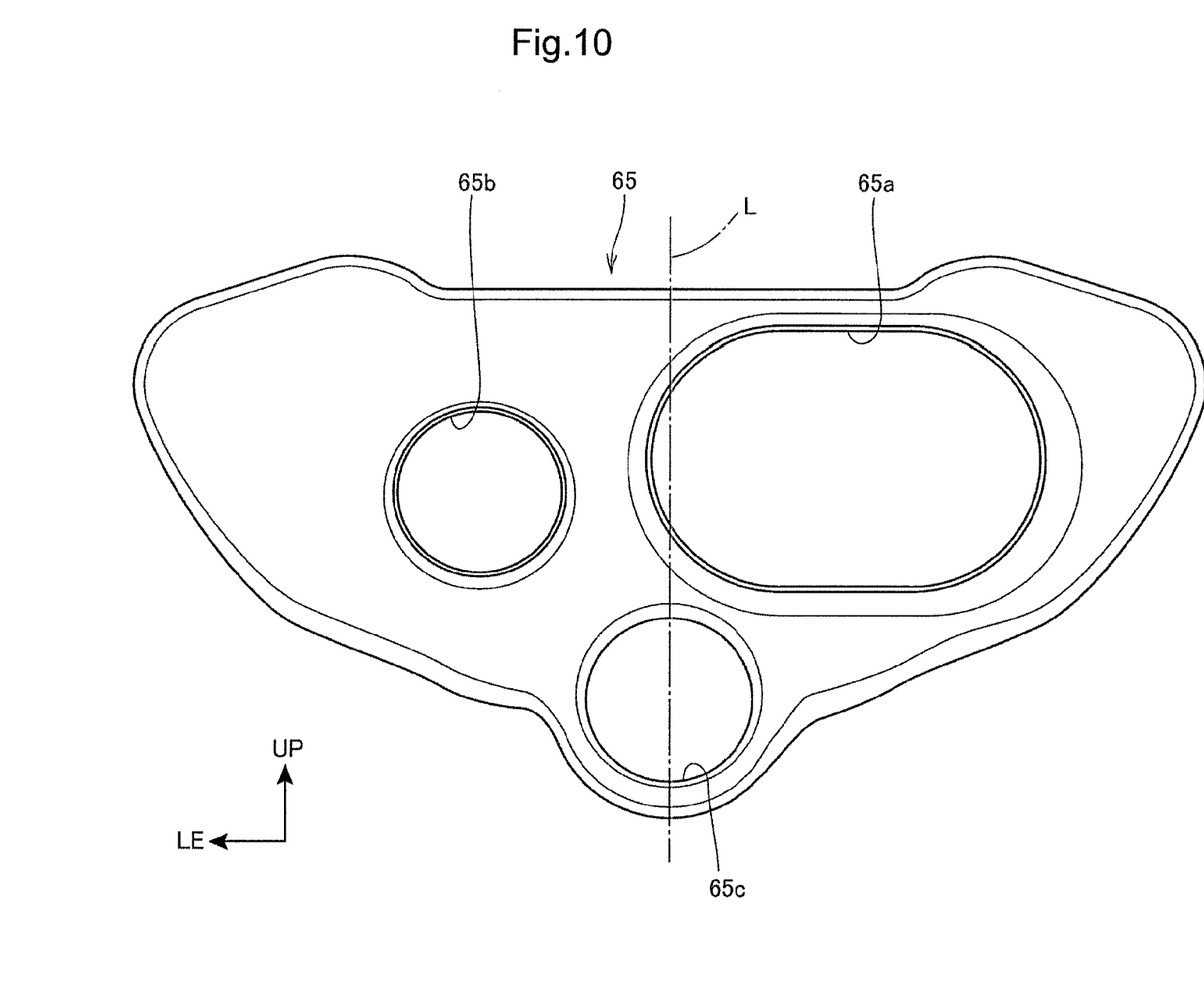
FIG. 10 is a front view of a partition as seen from the vehicle rear side.

FIG. 10 is a front view of the partition 65 as seen from the vehicle rear side.

The partition 65 has a substantially reverse triangular shape in accordance with the shape of the muffler main body 55, and its periphery is coupled with the inner wall of the muffler main body 55.

The partition 65 has a supporting hole portion 65a into which the first communication pipe 67 is fitted, a supporting hole portion 65b into which the second communication pipe 68 is fitted, and a supporting hole portion 65c into which the tail pipe 69 is fitted.

Each of the supporting hole portions 65a, 65b, 65c has a rib portion formed by bending the inner edge of the hole, and the first communication pipe 67, the second communication pipe 68, and the tail pipe 69 are each supported by being fitted to the inner face of the rib portion.

The supporting hole portion 65a is arranged close to one side (right side) of the center line L in an upper portion of the partition 65. The supporting hole portion 65b is arranged on the other side (left side) of the center line L in the upper portion of the partition 65. The supporting hole portion 65c is arranged in a position overlapping with the center line L in a lower portion of the partition 65.

Diameters of the supporting hole portion 65b and supporting hole portion 65c are substantially the same. The supporting hole portion 65a is formed so as to have a larger diameter than the supporting hole portion 65b or supporting hole portion 65c in correspondence with the shape of the first communication pipe 67, and has a flat shape longer in the vehicle width direction than in the vertical direction.

Referring to FIGS. 6 to 10, the first communication pipe 67 is arranged close to one side (right side) of the center line L in an upper portion inside the muffler main body 55. The first communication pipe 67 is supported by being fitted in the supporting hole portion 65a in a direction substantially orthogonal to the partition 65, and extends substantially straight in an obliquely upwardly manner in the rear direction, along the bottom wall portion 61.

The first communication pipe 67 is a pipe formed flat being longer in its width direction than its thickness direction, and tapered such that its diameter expands toward its rear end.

A front end 67a of the first communication pipe 67 is connected to the rear end of the introduction pipe 66 inside the second expansion chamber C2. A rear end 67b of the first communication pipe 67 is positioned in a middle portion in the longitudinal direction inside the first expansion chamber C1. A catalyzer in which a catalyst material is carried by a honeycomb type support (not shown) is fitted and supported to an inner circumference of the first communication pipe 67. The catalyzer is provided along substantially the entire length of the first communication pipe 67. More specifically, the first communication pipe 67 not only is a pipe configured to introduce exhaust air into the first expansion chamber C1, but also is a catalyst for purifying exhaust air.

The second communication pipe 68 is arranged on the other side (left side) of the center line L in the upper portion inside the muffler main body 55. The second communication pipe 68 is supported by being fitted in the supporting hole portion 65b in a direction substantially orthogonal to the partition 65, and extends substantially straight in an obliquely upward manner in the rear direction, along the bottom wall portion 61.

The second communication pipe 68 is a pipe having a substantially fixed diameter along its entire length, and having a substantially circular cross section. A front end 68a of the second communication pipe 68 is positioned inside the second expansion chamber C2. A rear end 68b of the second communication pipe 68 extends further rearwardly than the rear end 67b of the first communication pipe 67, and is positioned in a rear portion inside the first expansion chamber C1.

A rear portion of the second communication pipe 68 is fitted to and supported by a supporting wall 71 provided in the first expansion chamber C1.

The second communication pipe 68 is provided adjacent to the side of the first communication pipe 67 with the center line L in between, and is arranged in substantially the same height position as the first communication pipe 67 inside the muffler main body 55. As shown in FIG. 7, the diameter of the second communication pipe 68 is smaller than the thickness of the first communication pipe 67 in the vertical direction, and in side view, a part of the second communication pipe 68 except for its rear end portion overlaps with the first communication pipe 67.

The width W1 of the muffler main body 55 corresponds to its width in a height position where the first communication pipe 67 and the second communication pipe 68 are arranged. The width W2 of the muffler main body 55 corresponds to its width in a height position where the tail pipe 69 is arranged.

The tail pipe 69 is provided in the center in the vehicle width direction in a lower portion inside the muffler main body 55, and is arranged such that the position of its center substantially coincides with the center line L. In other words, the tail pipe 69 is arranged so as to be offset downwardly from the first communication pipe 67 and second communication pipe 68.

The supporting hole portions 65a, 65b, 65c of the partition 65 are penetrating positions through which the first communication pipe 67, the second communication pipe 68, and the tail pipe 69 penetrate, respectively. The supporting hole portions 65a, 65b are provided in substantially the same height positions, and the supporting hole portion 65c is arranged so as to be offset downwardly from the supporting hole portions 65a, 65b.

The tail pipe 69 is supported by being fitted in the supporting hole portion 65c in a direction substantially orthogonal to the partition 65, and extends substantially straight in an obliquely upwardly manner in the rear direction, along the bottom wall portion 61.

The tail pipe 69 is a pipe having a substantially fixed diameter along its entire length and having a substantially circular cross section, formed so as to have a smaller diameter but longer full length than the second communication pipe 68. The tail pipe 69 has its front end 69a (one end) fitted to and supported by the supporting hole portion 65c.

The rear wall portion 63 of the muffler main body 55 has a perpendicular portion 63a opposed to the rear end 67b and rear end 68b, and an inclined portion 63b extending obliquely downwardly in the front direction from the bottom end of the perpendicular portion 63a and connecting with the bottom wall-bulging portion 61a. More specifically, the inclined portion 63b is formed by welding, to the rear wall portion 63, a plate member disposed so as to close an opening formed in the rear wall portion 63.

The inclined portion 63b has an opening 72 (connecting portion to be connected to the inner wall) having a larger diameter than the outer diameter of the tail pipe 69. The tail pipe 69 has a tail pipe rear portion 69c extending to the outside of the muffler main body 55 and extending to the outside in the rear direction through the opening 72.

The tubular cover 70 covering the tail pipe rear portion 69c from its outer peripheral side is provided in the rear wall portion 63 of the muffler main body 55. The tubular cover 70 includes a tubular portion 73 having a larger diameter than the tail pipe 69, and a cap 74 closing the rear end of the tubular portion 73.

The tubular portion 73 has, at its tip end, a tapered portion 73a which is formed by cutting the tubular portion 73 at an oblique angle, and the tapered portion 73a is connected to the periphery of the opening 72. The tubular cover 70 is welded to the inclined portion 63b by a welding bead (not shown) formed on the periphery of the tapered portion 73a. The tubular portion 73 is tapered such that its diameter increases toward the rear.

The cap 74 has a rear end-supporting hole 74a fitted to a rear end 69b (other end) of the tail pipe 69, and an annular lid member 74b closing a gap between an outer circumference of the rear end 69b and an inner circumference of the tubular portion 73. The lid member 74b is tapered so as to extend rearwardly from the rear end 69b and such that its diameter increases toward the rear.

The tail portion 56 has a double pipe structure where the tail pipe 69 is covered by the tubular cover 70. The tubular cover 70 is arranged so as to be substantially coaxial with the tail pipe 69, and a rear expansion chamber 75 communicating into the first expansion chamber C1 through the opening 72 is formed between the tubular cover 70 and tail pipe 69. This ensures a large capacity of the first expansion chamber C1.

Exhaust air G1 introduced into the rear bank-muffler 29 through the junction pipe 52 flows into the first communication pipe 67 inside the first expansion chamber C1 from the introduction pipe 66 on one side of the muffler main body 55, and after being purified by the catalyst in the first communication pipe 67, flows into the first expansion chamber C1 in the rear portion and expands. Exhaust air G2 having expanded in the first expansion chamber C1 turns around, flows into the second expansion chamber C2 through the second communication pipe 68, and expands in the second expansion chamber C2 in the front portion. In addition, a part of the exhaust air G2 flows into the rear expansion chamber 75 and expands. Since the rear end 67b of the first communication pipe 67 is opposed to the rear expansion chamber 75, exhaust air flows into the rear expansion chamber 75 easily, and the rear expansion chamber 75 can be used effectively as an expansion chamber. Exhaust air G3 having expanded in the second expansion chamber C2 turns around, passes through the tail pipe 69, and is discharged to the outside from the rear end 69b.

While the first communication pipe 67 is a pipe for directly introducing exhaust gas from the exhaust pipe 28 to the first expansion chamber C1 in the rear portion, it can also be said that the first communication pipe is a connecting pipe supported by the partition 65 to connect the first expansion chamber C1 and second expansion chamber C2.

In this embodiment, inside the muffler main body 55 formed into a substantially reverse triangular shape projecting downwardly, the first communication pipe 67 and second communication pipe 68 are provided side by side in the upper portion, and the tail pipe 69 is provided so as to be offset downwardly from the first communication pipe 67 and second communication pipe 68. Accordingly, the first communication pipe 67 and second communication pipe 68 can be prevented from interfering with the tail pipe 69, so that the tail pipe 69 can be formed as long as possible to allow the engine 11 to have a desired engine characteristic. Moreover, since the first expansion chamber C1 is provided in the rear portion of the muffler main body 55 and the second expansion chamber C2 in the front portion thereof, the tail pipe 69 can be extended from the front to rear portions of the muffler main body 55, achieving a long tail pipe 69.

In addition, since the tail pipe 69 is offset downwardly from the first communication pipe 67 and second communication pipe 68 at the center in the vehicle width direction, the muffler main body 55 can be formed into the substantially reverse triangular shape, and the rear cowl 35 covering the muffler main body 55 can also be formed into the substantially reverse triangular shape having a small air resistance. Thus, while adopting the configuration where the tail pipe 69 can be elongated, air resistance of the motorcycle 10 can be reduced. Further, since air flows smoothly along the bottom face 42 of the rear cowl 35, hot air can be discharged efficiently from the exhaust holes 44, 44.

Since the first communication pipe 67 as the catalyst is formed flat and longer in its width direction than its thickness direction the capacity of the catalyst can be ensured while a space can be secured below the first communication pipe 67. Thus, the first communication pipe 67 does not interfere with the tail pipe 69, so that the tail pipe 69 can be arranged below the first communication pipe 67 to elongate the first communication pipe 67. In addition, since the catalyst is provided in the muffler main body 55, there is no need to provide a catalyst in the exhaust pipe 28, whereby exhaust air can pass through the exhaust pipe 28 at a higher flow velocity, and exhaust efficiency can be enhanced.

As shown in FIG. 2, in a side view, the tail portion 56 has its bottom face extending rearwardly so as to be continuous with the bottom face of the downwardly-bulging portion 42a, and its rear end positioned slightly closer to the front than the rear edge portion 35c of the rear cowl 35. Thus, the tail portion 56 appears as though it is integrated with the rear cowl 35, which improves the appearance.

Moreover, since the stay fixing portions 46, 46 are provided in the base portion of the downwardly-bulging portion 42a on inner sides of the exhaust holes 44, 44 in the vehicle width direction, the stay fixing portions 46, 46 do not interfere with the exhaust holes 44, 44, and thus the rear bank-muffler 29 can be cooled efficiently.

As has been described, according to the embodiment to which the present invention is applied, the outlines of rear bank-muffler 29 and rear cowl 35 covering the rear bank-muffler 29 are each formed such that the width decreases toward the vehicle rear; the tail pipe 69, first communication pipe 67, and second communication pipe 68 are provided so as to penetrate the partition 65; and the supporting hole portion 65c is the position where the tail pipe 69 penetrates the partition 65. The supporting hole portions 65a, 65b are positions wherein the first communication pipe 67 and second communication pipe 68 penetrating the partition 65 are offset from each other in the vertical direction. As a result, the penetrating positions of the first communication pipe 67 and second communication pipe 68 do not interfere with that of the tail pipe 69, whereby the tail pipe 69 can be elongated even when the rear bank-muffler 29 and rear cowl 35 are formed such that their widths decrease toward the vehicle rear. In addition, the rear bank-muffler 29 can be downsized in the width direction.

The front end 69a of the tail pipe 69 is arranged in the foremost second expansion chamber C2 among the expansion chambers of the rear bank-muffler 29, and the rear end 69b of the tail pipe 69 is opened to outside air from the rear portion of the rear bank-muffler 29. Thus, the tail pipe 69 can be extended from the foremost second expansion chamber C2, so that the tail pipe 69 can be elongated.

The rear bank-muffler 29 is partitioned into the first expansion chamber C1 in the rear portion and the second expansion chamber C2 in the front portion; exhaust air introduced into the rear bank-muffler 29 from the exhaust pipe 28 flows into the second expansion chamber C2 through the first communication pipe 67 and second communication pipe 68; the front end 69a of the tail pipe 69 is arranged in the second expansion chamber C2; and the rear end 69b thereof is opened to outside air from the rear portion of the rear bank-muffler 29. Thus, it is possible to elongate the tail pipe 69 by extending it from the second expansion chamber C2 in the front portion to the rear portion of the rear bank-muffler 29.

The first communication pipe 67 as the catalyst accommodated inside the rear bank-muffler 29 is supported by the partition 65, and the first communication pipe 67 and second communication pipe 68 are arranged at substantially same height in the vertical direction. For this reason, although the first communication pipe 67 functioning as the catalyst is accommodated inside the rear bank-muffler 29 in this configuration, the catalyst can be prevented from interfering with the tail pipe 69, and thus the tail pipe 69 can be elongated.

In addition, since the first communication pipe 67 as the catalyst is formed into a flat shape whose longitudinal direction is its width direction, the first communication pipe 67 can be downsized in the vertical direction while ensuring capacity of the catalyst. Consequently, the first communication pipe 67 does not interfere with the tail pipe 69, so that the tail pipe 69 can be elongated.

Furthermore, the outline of the rear bank-muffler 29 is formed such that the width W2 in the height position where the tail pipe 69 is arranged is smaller than the width W1 in the height position where the first communication pipe 67 and second communication pipe 68 are arranged. Thus, the width of the portion of the rear cowl 35 covering the vicinity of the tail pipe 69 can be reduced, whereby the rear bank-muffler 29 and the rear cowl 35 can be downsized.

Moreover, there is provided the tubular cover 70 covering the tail pipe rear portion 69c from outside in the radial direction; the rear ends 67b, 68b of the first communication pipe 67 and second communication pipe 68 are opposed to the inner wall of the rear wall portion 63 of the rear bank-muffler 29; and the space between the tubular cover 70 and tail pipe rear portion 69c communicates into the first expansion chamber C1 through the opening 72 being the connecting portion between the tubular cover 70 and rear wall portion 63. More specifically, since the space between the tubular cover 70 and tail pipe rear portion 69c can be used as the rear expansion chamber 75, the rear bank-muffler 29 can be downsized while capacity of the first expansion chamber C1 can be ensured.

The tubular cover 70 is connected to the muffler main body 55 by welding with the tapered portion 73a being the connecting portion is tapered in a side view. Thus, an area of the welding portion of the tubular cover 70 can be enlarged, and rigidity can be enhanced.

Note that the above embodiment is one aspect to which the present invention is applied, and the present invention is not limited to the above embodiment.

Although the above embodiment has been described by citing the first communication pipe 67 and second communication pipe 68 as examples of connecting pipes, the present invention is not limited to this. It suffices that the tail pipe 69 is offset in the vertical direction at least from the second communication pipe 68. In this case, exhaust air is introduced into the first expansion chamber C1 through a pipe provided in a position different from the first communication pipe 67, for example.

Although in the description of the above embodiment the catalyzer is provided in the first communication pipe 67, the present invention is not limited to this. The first communication pipe 67 may be a simple pipe not provided with the catalyzer.

Although the above embodiment has been described by citing the V4 engine 11 as an example, the present invention is not limited to this. It suffices that at lest the rear bank-muffler 29 is covered by the rear cowl 35, and the invention is applicable regardless of whether the engine is a single cylinder, parallel, horizontally opposed, or other type.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An exhaust structure of a vehicle comprising:
an engine;
an exhaust device operatively connected to the engine; and
a rear cowl covering a vehicle rear portion, said exhaust device including an exhaust pipe and a muffler connected to a rear portion of the exhaust pipe, said muffler including a main body formed by a top wall extending beneath and along a top face of the rear cowl and a bottom wall extending obliquely upwardly in a rear direction of the vehicle above and along a bottom face of the rear cowl, a plurality of expansion chambers partitioned by a partition, connecting pipes connecting the plurality of expansion chambers, and a tail pipe configured to discharge exhaust air from said muffler; said muffler being covered by said rear cowl, wherein:
outlines of said muffler and said rear cowl are each formed such that a width decreases toward the rear direction of the vehicle;
said tail pipe and said connecting pipes are provided so as to penetrate said partition;
positions where said tail pipe and said connecting pipes penetrate said partition are offset from each other in the vertical direction; and
an outline of said muffler is formed such that the bottom wall of the main body that extends obliquely upwardly in the rear direction of the vehicle above and along the bottom face of the rear cowl forms a width in a height position where said tail pipe is arranged that is smaller relative to a width in a height position where said connecting pipe and a catalyst are arranged.

2. The exhaust structure of a vehicle according to claim 1, wherein:
one end of said tail pipe is arranged in a foremost expansion chamber among said expansion chambers of said muffler; and
the other end of said tail pipe is opened to outside air from a rear portion of said muffler.

3. The exhaust structure of a vehicle according to claim 1, wherein:
said muffler is partitioned into a first expansion chamber in a rear portion and a second expansion chamber in a front portion;
exhaust air introduced into said muffler from said exhaust pipe flows into said second expansion chamber through said connecting pipes;
the one end of said tail pipe is arranged in said second expansion chamber;
and the other end of said tail pipe is opened to outside air from a rear portion of said muffler.

4. The exhaust structure of a vehicle according to claim 2, wherein:
said muffler is partitioned into a first expansion chamber in a rear portion and a second expansion chamber in a front portion;
exhaust air introduced into said muffler from said exhaust pipe flows into said second expansion chamber through said connecting pipes;
the one end of said tail pipe is arranged in said second expansion chamber;
and the other end of said tail pipe is opened to outside air from a rear portion of said muffler.

5. The exhaust structure of a vehicle according to claim 1, wherein:
the catalyst is accommodated inside said muffler and is supported by said partition; and
the catalyst and said connecting pipe are arranged at substantially the same height in the vertical direction.

6. The exhaust structure of a vehicle according to claim 2, wherein:
the catalyst is accommodated inside said muffler and is supported by said partition; and
the catalyst and said connecting pipe are arranged at substantially the same height in the vertical direction.

7. The exhaust structure of a vehicle according to claim 3, wherein:
the catalyst is accommodated inside said muffler and is supported by said partition; and
the catalyst and said connecting pipe are arranged at substantially the same height in the vertical direction.

8. The exhaust structure of a vehicle according to claim 5, wherein said catalyst is formed into a flat shape whose longitudinal direction is its width direction.

9. The exhaust structure of a vehicle according to claim 1, wherein:
a tubular cover member covers a part of said tail pipe from outside in the radial direction;
ends of said catalyst and said connecting pipe are opposed to an inner wall of said muffler; and
a space between said cover member and said tail pipe communicates into said first expansion chamber through a connecting portion between said cover member and said inner wall.

10. The exhaust structure of a vehicle according to claim 2, wherein:
a tubular cover member covers a part of said tail pipe from outside in the radial direction;
ends of said catalyst and said connecting pipe are opposed to an inner wall of said muffler; and
a space between said cover member and said tail pipe communicates into said first expansion chamber through a connecting portion between said cover member and said inner wall.

11. The exhaust structure of a vehicle according to claim 3, wherein:
a tubular cover member covers a part of said tail pipe from outside in the radial direction;

ends of said catalyst and said connecting pipe are opposed to an inner wall of said muffler; and a space between said cover member and said tail pipe communicates into said first expansion chamber through a connecting portion between said cover member and said inner wall.

12. The exhaust structure of a vehicle according to claim 9, wherein:

said cover member is connected to said muffler by welding; and a connecting portion thereof is tapered in side view.

13. An exhaust structure of a vehicle comprising:

an engine;

an exhaust device operatively connected to the engine; and an exhaust pipe and a muffler connected to a rear portion of the exhaust pipe;

a plurality of expansion chambers formed in said muffler, said plurality of expansion chambers being partitioned by a partition;

connecting pipes connecting the plurality of expansion chambers;

a tail pipe configured to discharge exhaust air from said muffler;

a rear cowl covering a vehicle rear portion, said muffler being covered by said rear cowl and including a main body formed by a top wall extending beneath and along a top face of the rear cowl and a bottom wall extending obliquely upwardly in a rear direction of the vehicle above and along a bottom face of the rear cowl, wherein:

outlines of said muffler and said rear cowl are each formed such that a width decreases toward the rear direction of the vehicle;

said tail pipe and said connecting pipes are provided so as to penetrate said partition;

positions where said tail pipe and said connecting pipes penetrate said partition are offset from each other in the vertical direction; and an outline of said muffler is formed such that the bottom wall of the main body that extends obliquely upwardly in the rear direction of the vehicle above and along the bottom face of the rear cowl forms a width in a height position where said tail pipe is arranged that is smaller relative to a width in a height position where said connecting pipe and a catalyst are arranged.

14. The exhaust structure of a vehicle according to claim 13, wherein:

one end of said tail pipe is arranged in a foremost expansion chamber among said expansion chambers of said muffler; and the other end of said tail pipe is opened to outside air from a rear portion of said muffler.

15. The exhaust structure of a vehicle according to claim 13, wherein:

said muffler is partitioned into a first expansion chamber in a rear portion and a second expansion chamber in a front portion;

exhaust air introduced into said muffler from said exhaust pipe flows into said second expansion chamber through said connecting pipes;

the one end of said tail pipe is arranged in said second expansion chamber;

and the other end of said tail pipe is opened to outside air from a rear portion of said muffler.

16. The exhaust structure of a vehicle according to claim 13, wherein:

the catalyst is accommodated inside said muffler and is supported by said partition; and the catalyst and said connecting pipe are arranged at substantially the same height in the vertical direction.

17. The exhaust structure of a vehicle according to claim 16, wherein said catalyst is formed into a flat shape whose longitudinal direction is its width direction.

* * * * *